(12) United States Patent
DuBose et al.

(10) Patent No.: US 8,115,341 B2
(45) Date of Patent: Feb. 14, 2012

(54) POWER CONVERTER HAVING AIRPLANE POWER SOURCE FREQUENCY DETECTOR

(75) Inventors: Richard G. DuBose, Scottsdale, AZ (US); Bryan W. McCoy, Phoenix, AZ (US)

(73) Assignee: Igo, Inc., Scottsdale, AZ (US)

( * ) Notice: Subject to any disclaimer, the term of this patent is extended or adjusted under 35 U.S.C. 154(b) by 215 days.

(21) Appl. No.: 12/316,279

(22) Filed: Dec. 11, 2008

(65) Prior Publication Data

US 2009/0128105 A1   May 21, 2009

Related U.S. Application Data

(63) Continuation of application No. 11/202,815, filed on Aug. 12, 2005, now Pat. No. 7,554,218.

(51) Int. Cl.
- *H02J 1/00* (2006.01)
- *H02J 3/00* (2006.01)
- *H01H 35/00* (2006.01)
- *H01H 9/30* (2006.01)
- *B60L 1/00* (2006.01)

(52) U.S. Cl. ............ 307/73; 307/75; 307/129; 307/139; 307/9.1

(58) Field of Classification Search ............ 307/73, 307/75, 129, 139, 9.1, 10.1
See application file for complete search history.

(56) References Cited

U.S. PATENT DOCUMENTS

| | | | |
|---|---|---|---|
| 5,499,187 A | 3/1996 | Smith | |
| 6,358,096 B1 * | 3/2002 | Beckman | 439/638 |
| 6,538,341 B1 * | 3/2003 | Lang | 307/18 |
| 6,599,141 B2 | 7/2003 | Hambley et al. | |
| 6,828,760 B2 | 12/2004 | Massey et al. | |
| 7,002,265 B2 * | 2/2006 | Potega | 307/149 |
| 7,224,086 B2 * | 5/2007 | Germagian et al. | 307/128 |
| 2005/0162020 A1 | 7/2005 | Lanni | |
| 2006/0098358 A1 * | 5/2006 | Wambsganss et al. | 361/18 |
| 2007/0220286 A1 | 9/2007 | Benton et al. | |

* cited by examiner

*Primary Examiner* — Michael Rutland Wallis
(74) *Attorney, Agent, or Firm* — Snell & Wilmer L.L.P.

(57) ABSTRACT

A power converter having an aircraft power source detector configured to limit the amount of power that can be drawn by the power converter when utilized in an aircraft. The power converter may detect an artifact of the aircraft power source, such as the 400 Hz ripple noise on an aircraft power line, or existing in the aircraft cabin, such EMI or aircraft lighting.

16 Claims, 3 Drawing Sheets

POWER CONVERTER HAVING AIRPLANE POWER SOURCE FREQUENCY DETECTOR

CLAIM OF PRIORITY

This application is a Continuation of U.S. patent application Ser. No. 11/202,815 entitled POWER CONVERTER HAVING AIRPLANE POWER SOURCE DETECTOR, filed Aug. 12, 2005, now U.S. Pat. No. 7,554,218 the teaching of which are incorporated herein by reference.

FIELD OF THE INVENTION

The present invention is generally related to power converters configured to power portable electronic devices, and more particularly to power converters configured to be utilized in aircraft and subject to power limitations.

BACKGROUND OF THE INVENTION

Power converters, including those configured to operate from DC power sources provided by vehicles and other DC power sources, may include what is commonly referred to as a cigarette lighter adapter (CLA). This CLA typically includes a DC/DC or AC/DC power converter configured to convert an input voltage of the power source to an output DC voltage suitable for powering a portable electronic device. This CLA may be configured to limit the voltage output and/or current output therefrom due to the needs of a device to be powered, and due to other safety and certification agency requirements.

Some CLA power adapters are also configured to be used in aircraft sockets provided proximate the passenger seats, allowing the passenger to power notebook computers, MP3 players and other portable electronic devices. Aircraft power sources typically provide a higher DC voltage such as 16-24 VDC, than provided by automobiles, such as 12-14 VDC. Due to safety concerns, and load balancing, there are requirements that CLA power adapters not be permitted to draw more than a predetermined power limit, such as 60 watts. Power systems deployed within the aircraft typically limit the amount of power that can be delivered to any one power socket accessible by the passenger. Some aircraft include safety mechanisms that will crowbar, or become deactivated, if a CLA attempts to draw more than 60 watts.

There is desired an improved power converter, such as a CLA power converter/adapter, that automatically limits power drawn from an aircraft power source to no more than a predetermined limit, such as 60 watts.

SUMMARY OF INVENTION

The present invention achieves technical advantages as a power converter having an aircraft power source detector configured to limit the amount of power that can be drawn by the power converter when utilized in an aircraft.

In a first embodiment of the present invention, the power converter is configured to physically sense the presence of an aircraft socket configured to deliver power thereto. The power converter may be powered with a mechanism to detect an annular bar within the socket of the aircraft power source, which bar is conventionally provided in an aircraft socket and utilized to allow the aircraft to detect the presence of an electronic device. Power may only be provided to this socket when this bar is depressed by a converter disposed within the socket, such as a CLA. The present invention is provided with a mechanism to detect the presence of this bar, and automatically limits the power converter from drawing power no greater than a predetermined limit specified for the aircraft, such as 60 watts. In a second embodiment of the present invention, the power converter is provided with electronics detecting the presence of an aircraft power source. Aircraft providing power to passengers typically draw power generated by an auxiliary power unit (APU) of the aircraft, the aircraft engines or ground power units. The use of the acronym APU from here on will include the several sources of aircraft AC power mentioned above. Conventionally, this APU provides power to the aircraft, and also to the passenger's seats. The APU is characterized in that a 400 Hz frequency component is typically generated by the APU, which is detectable as a 400 Hz noise ripple on the power line. This 400 Hz frequency component is also detectable within the ambient of the aircraft cabin as an electromagnetic interference (EMI) signal, or detectable in the aircraft lighting. The present invention is configured to detect this 400 Hz frequency component or its artifacts, either existing on the power line or within the passenger cabin, to determine that the power source coupled to the converter is that generated by an aircraft. Upon detection of this 400 Hz frequency component or its artifacts, the power converter is configured to limit its power draw from the aircraft power source. Detection of the power line voltage may also be analyzed to determine if the power may be aircraft power, such as the voltage exceeding a threshold, such as 14.5 volts DC.

In a third embodiment of the present invention, an adaptation of the CLA is useable in aircraft. The connector consists of two power pins and two sense pins. A potential can be measured between pins A and B, such as 3 V. Power may only be provided to a power adapter when an impedance, such as 300 ohms, is placed between pin A and pin B as shown in the FIGS. 4 and 7. If the impedance is divided into two parts by resistor R1 and R2 then the presence of a voltage at diode D3 indicates the presence of an aircraft by opamp U1.

DETAILED DESCRIPTION OF THE PRESENT INVENTION

Figure 1:
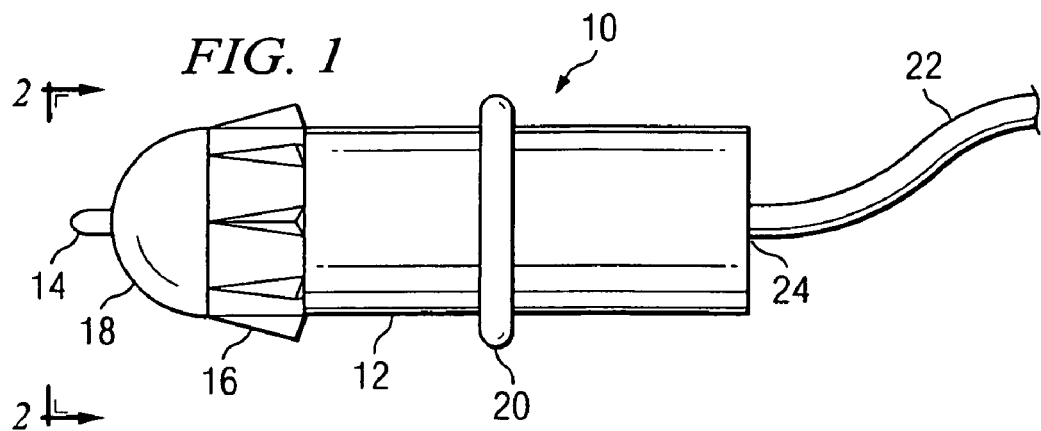
FIG. 1 is a view of a power converter according to a first embodiment of the present invention.

FIG. 1 depicts a side view of a power converter 10 according to a first embodiment of the present invention. Power converter 10 is seen to comprise of a power converter configured as cigarette lighter adapter (CLA) power converter, although limitation to this specific mechanical design is not to be inferred. The converter may comprise of a DC/DC or an AC/DC converter as desired. CLA 10 is seen to include an elongated cylindrical body 12 having an electrode 14 on a proximal end thereof configured to make physical and electrical contact with the positive terminal within a power socket deployed in an aircraft, as well as that available in an automobile or other vehicle. A second electrode 16, configured as a series of annular spring-leaf members, forms the negative terminal for the power converter 10, and is seen to be electrically separated from terminal 14 by a dielectric portion 18 disposed therebetween. Notably, the negative electrode 16 is moved more forward toward the proximal end of the CLA converter 10 than that typically utilized in standard automobile CLA adapters. Advantageously, this negative electrode 16 is disposed closely proximate the distal end of the body 12, and proximate the electrode 14, so as to be physically and electrically separated from a midsection thereof.

Still referring to FIG. 1, there is shown disposed about the midsection of the body 12 an annular member 20, that may resemble an annular bumper. This annular member can be inwardly biased toward the body 12 when physically interfaced with the bar (not shown) typically deployed within a power socket deployed within an aircraft, such as under the seat, or adjacent an armrest. This displaced annular member is detectable by a control circuit 40, shown in FIG. 4, and which will be described in more detail shortly. Upon detection of this annular member displacement, the power converter is configured to draw no more than a maximum predetermined power from the aircraft socket, via electrodes 14 and 16, such as 60 watts. Power converter 10 is further seen to include a power cord 22 extending from the power converter 10 and configured to connect to a portable electronic device for powering thereof, such as via a connector. Power cord 22 extends from an interface 24, which my comprise of a connector providing a DC voltage on one conductor and ground on the other. Alternatively, power cord 22 can be hard wired to the power converter circuitry within power converter 10.

Figure 2:
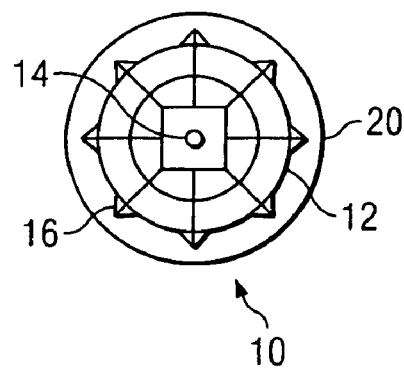
FIG. 2 is a cross sectional view taken along line 2-2 in FIG. 1.

Referring now to FIG. 2, there is shown a cross sectional view taken along line 2-2 in FIG. 1, illustrating the cylindrical body 12 and the annular displaceable member 20. The ground electrode 16 is seen to be electrically connected to the power converter circuit 30 disposed within the housing 12.

Figure 3:
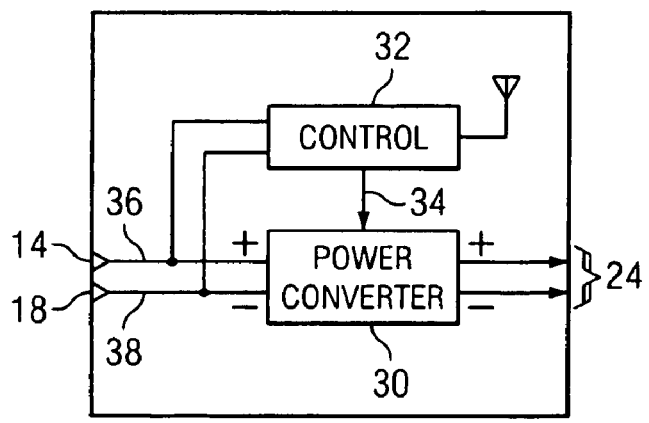
FIG. 3 is an electrical block diagram of the power converter shown in FIG. 1 including a control circuit.

Referring now to FIG. 3, there is shown an electrical block diagram of the power converter 10 seen to include the power converter circuitry 30, and in addition, a control 32. Control 32 may be comprised of a mechanical mechanism for detecting the presence of aircraft socket, or, as an electrical circuit configured to sense an electrical parameter provided on either of power lines 36 and 38 extending from electrodes 14 and 18.

In the embodiment shown in FIG. 1, control 32 is illustrated in block diagram form as a displaceable mechanical mechanism configured to provide an indication on line 34 to power converter circuitry 30 that the converter 10 is inserted into the socket of an aircraft. Power converter circuitry 30 is functionality responsive to this indication and responsively limits the amount of power delivered to output terminal 34 to a predetermined limit, such as 60 watts. Should a user utilize the power converter 10 to power a portable electronic device, the power drawn is limited to this predetermined limit. This provides an automatic safety mechanism to avoid overloading the aircraft socket, the aircraft power system, and to avoid heat or other safety hazards.

In another embodiment of the invention, the control device 32 is comprised of an electrical circuit electrically coupled to lines 36 and 38 configured to detect an electrical parameter of the aircraft power system, such as a 400 Hz carrier generated by the APU of the aircraft, or other electrical component generated by the APU. Conventionally, the onboard APU of the aircraft provides a small amount of noise on the power system, detectable as an AC ripple carried on the DC power line provided to electrode 14. This 400 Hz frequency component or its artifacts may also be detectable on the ground of the electrical system, depending on the electrical configuration. The aircraft power system is designed to minimize this 400 Hz carrier or artifacts; however, it exists even at a very minimal level and is detectable by a control 32. Control 32, upon detection of this 400 Hz carrier or artifacts, provides an electrical signal on line 34 to the power converter circuit 30, indicating the presence of an aircraft power system. Again, power converter circuit 30 limits the output power provided to terminal 24 upon detection thereof, and may modify the processing of power drawn therefrom if desired. In one embodiment, the 400 Hz carrier may be rectified by a full-wave rectifier, and a detector may detect the resulting 800 Hz waveform.

In yet another embodiment, control 32 may detect the presence of the 400 Hz frequency component as EMI interference within the passenger cabin, detectable via a small RF antenna. Upon detection of this 400 Hz frequency component, the control 32 also provides the signal on line 34 indicative of this 400 Hz carrier. Control 32 may also detect the presence of the 400 Hz frequency component affecting the aircraft cabin lighting, such as using a photocell, photodiode or other devise.

Figure 4:
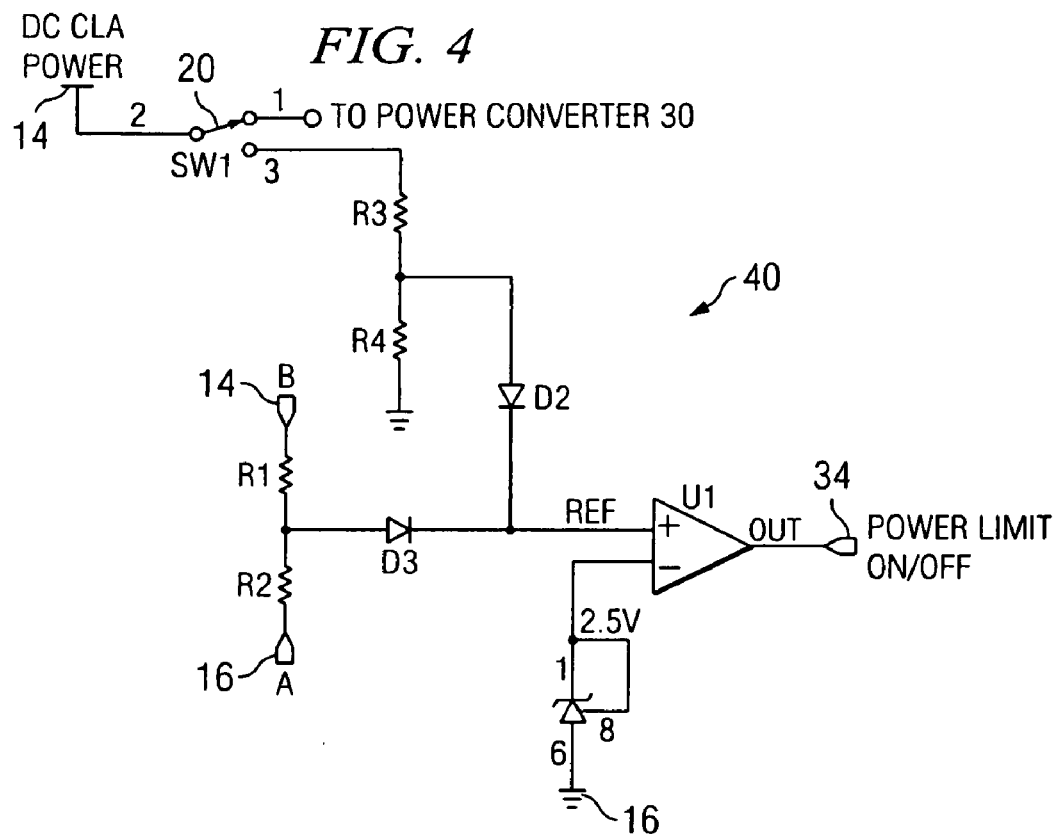
FIG. 4 is an electrical schematic of one embodiment of the present invention configured to detect that the input power is provided by an aircraft.
Figure 7:
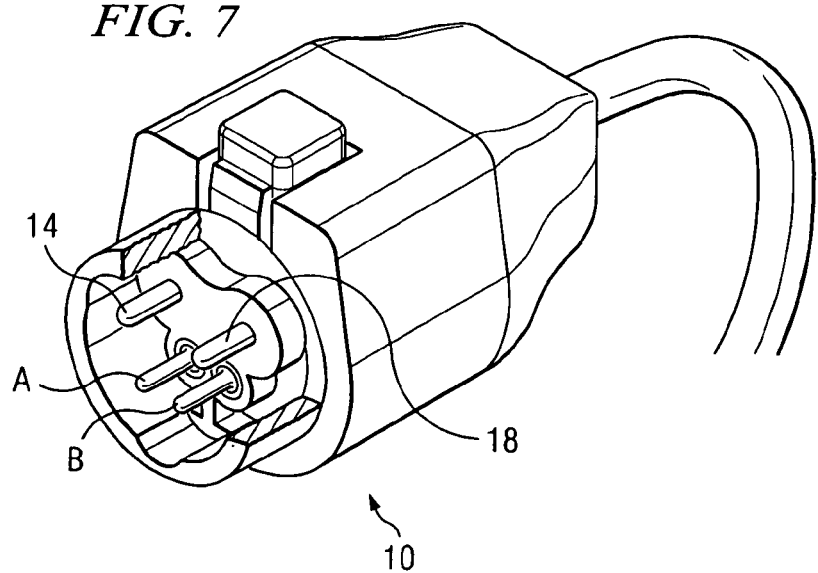
FIG. 7 is a diagram showing the mechanical connection of the invention.

Referring now to FIG. 4, there is shown at 40 one embodiment of a circuit configured to respond to mechanical embodiment of the invention, such as that shown in FIG. 1. Switch SW1 is electrically represented as the deflectable annular member 20 in FIG. 1, and normally provides power from electrode 14 to the power converter circuit 30 when not displaced. When the annular member 20 is compressed, such as due to engagement with the bar in the aircraft socket, switch SW1 closes and communicates the positive voltage from electrode 14 thru a series of components to an op amp U1, which compares a conditioned voltage to a reference voltage. When switch SW1 is closed, op amp U1 is configured to generate a signal at output 34 which indicates that switch SW1 is closed, indicating the presence of an aircraft power source. FIGS. 4 and 7 also show points A and B, which when connected together with predetermined impedance, allows the aircraft to supply power to a power product. The potential that is applied between points A and B is conditioned and compared at the operational amp U1 to a reference voltage. The operational amplifier then produces a signal at 34 to indicate that an aircraft has been detected.

Figure 5:
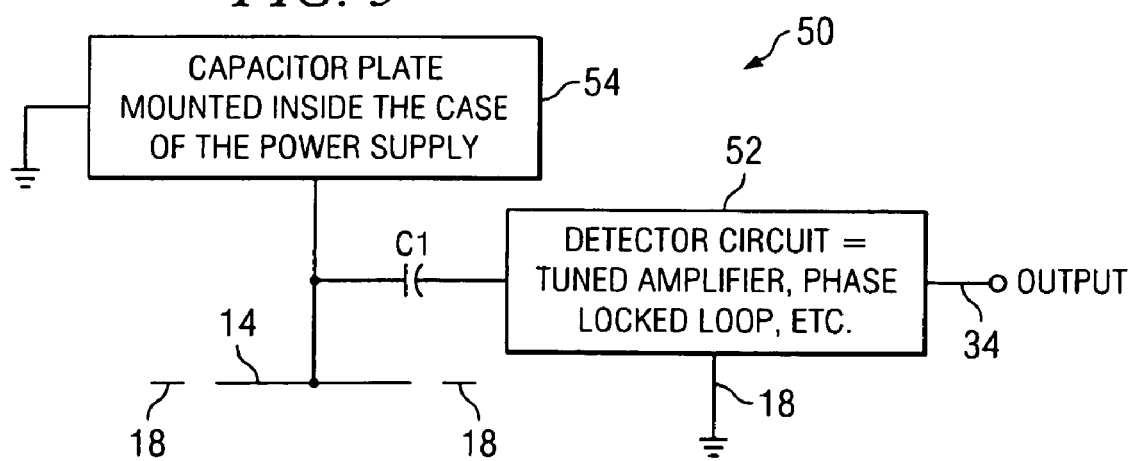
FIG. 5 is a second embodiment of the present invention configured to detect a frequency component on the input power line generated by the aircraft, and/or as an EMI signal within the passenger cabin.

Referring to FIG. 5, there is shown an electrical block diagram of a circuit 50 configured to detect the 400 Hz carrier or artifact on the aircraft power system as provided via electrode 14. In one embodiment, a detector circuit 52 may comprise of a tuned amplifier having a filter configured to detect the aircraft 400 Hz carrier, and which filter has a bandwidth sufficiently narrow to reject other frequencies that may be present on the power line, such as 60 Hz. In another embodiment, the detector circuit 52 may comprise of a phase locked loop (PLL) or other electrical circuits that can detect the presence of the 400 Hz carrier or artifact seen as a noise on the aircraft power line, such as a harmonic of the carrier. Circuit 52 generates an electrical signal on line 34 as previously described utilized by converter circuitry 30 to discern the presence of an aircraft power source. The detector circuit 52 may also comprise of a low frequency analog filter, such as a gyrator, a turned digital filter, or a resonant tank.

Also shown in FIG. 5 is a circuit 54 comprising a capacitor plate mounted inside the converter 10 and configured to detect the airborne presence of the 400 Hz signal. The 400 Hz airborne frequency component is essentially an RF EMI signal that can be received via the capacitor plate 54, or other suitable antenna mechanism.

The detection of this 400 Hz aircraft frequency component may also be used by power converter circuitry 30 to modify its signal processing and operation when it knows it is operating from an aircraft power system. For instance, additional filtering or gain adjustments may be automatically or selectively made upon indication of the aircraft power system.

The AC line frequency typically existing in commercial airliners and ground support systems is typically in the range of 400 Hz+/−12%. Accordingly, the signal processing capability of control circuit 30 would be available to detect a carrier frequency within this tolerance.

Still referring to FIG. 5, capacitor C1 is a coupling capacitor that connects either directly to the power input line of the aircraft system, or to the capacitor metal plate mounted within the power converter housing. For direct connections, the input could be DC or AC since either type of voltage can be available, depending on the aircraft. For indirect connection, the metal plate is capacity coupled, as discussed, to couple any 400 Hz electrical field present in the aircraft cabin.

The advantage of a PLL circuit as the control 32 is that the PLL circuit can operate within a narrow band and track the frequency component signal if its frequency varies.

Figure 6:
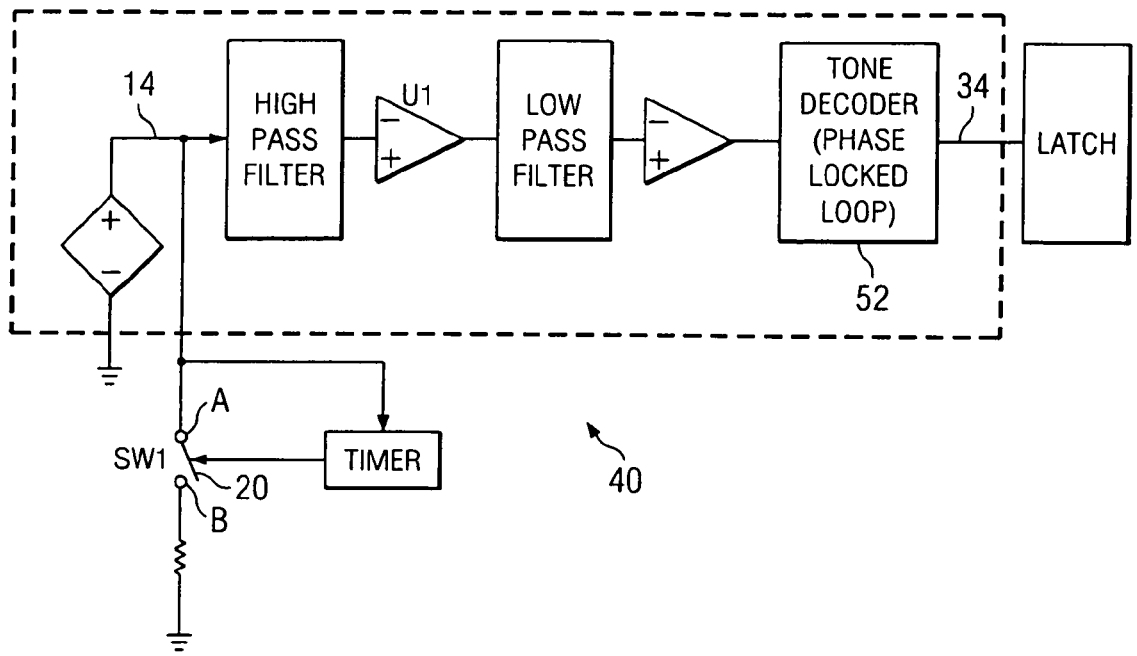
FIG. 6 is a block diagram showing an implementation with temporary loading to allow reliable detection of the 400 Hz artifacts from the input power line.

The circuit of FIG. 6 shows the implementation of the previously mentioned filters and phase locked loop decoder. Additionally, a temporary loading circuit has been added that is controlled by a timer. This timer operates briefly when power is first applied. During the interval when the timer operates, a loading resistor is switched onto the input power line and this causes the ripple from the input power source to increase. During this time of increased ripple the ability of the circuit within the dotted lines to detect the 400 Hz signal or its artifacts is enhanced. This leads to quicker and more accurate detection.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A power converter, comprising:
   a first circuit having an input configured to receive a power source having a first voltage, and configured to convert the first voltage to a second voltage provided to an output, the first circuit configured to power a portable electronic device; and
   a second circuit coupled to a receiver and to the first circuit and configured to identify if the power source is an aircraft power source by detecting noise of the power source by the receiver.

2. The power converter of claim 1 wherein the first circuit is configured to respond to the second circuit when the aircraft power source is detected.

3. The power converter of claim 2 wherein the first circuit is configured to limit an output power provided to an output when the aircraft power source is detected.

4. The power converter of claim 3 wherein the first circuit is configured to limit a current of the output power when the aircraft power source is detected.

5. The power converter of claim 2 wherein the first circuit is energized upon detection of the aircraft power source frequency.

6. The power converter of claim 1 wherein the second circuit is configured to detect a presence of generally a 400 Hz signal provided by the aircraft power source.

7. The power converter of claim 1 wherein the power converter further includes a connector configured to couple to the aircraft power source.

8. The power converter of claim 7 wherein the converter has a displaceable member configured to determine if the power source is provided by the aircraft power source.

9. The power converter of claim 5 wherein second circuit is configured to be electrically coupled to the aircraft power source.

10. The power converter of claim 9 wherein the converter further includes a connector configured to couple to the aircraft power source.

11. The power converter as specified in claim 5 wherein the second circuit is configured to detect the frequency component of an aircraft auxiliary power unit (APU).

12. The power converter of claim 1, wherein the receiver comprises at least one of an RF antenna, a photocell, and a photodiode.

13. A method, comprising:
    providing a first circuit configured to control power from an aircraft power source;
    providing a second circuit comprising a receiver, wherein the second circuit is configured to detect the presence of an active aircraft power source;
    monitoring an aircraft power source, by a second circuit, for noise;
    energizing the first circuit in response to the second circuit detecting the noise from the aircraft power source;
    supplying output power by the first circuit.

14. The method of claim 12, wherein the transitory electrical parameter is at least one of an aircraft auxiliary power unit carrier signal and an electro-magnetic interference.

15. The method of claim 13, wherein the receiver comprises at least one of an RF antenna, a photocell, and a photodiode.

16. A power converter, comprising:
    a first circuit having an input configured to receive a power source having a first voltage, and configured to convert the first voltage to a second voltage, the first circuit configured to power a portable electronic device; and
    a second circuit coupled to a receiver and to the first circuit and configured to identify if the power source is an aircraft power source by detecting an AC ripple of the power source.

* * * * *

UNITED STATES PATENT AND TRADEMARK OFFICE
CERTIFICATE OF CORRECTION

PATENT NO.         : 8,115,341 B2                                   Page 1 of 1
APPLICATION NO.    : 12/316279
DATED              : February 14, 2012
INVENTOR(S)        : Richard G. DuBose et al.

It is certified that error appears in the above-identified patent and that said Letters Patent is hereby corrected as shown below:

Specifically, column 6 of the patent under Claims 11, 13, 14 and 16 should be replaced with the following amended claims:

11. The power converter of claim 5 wherein the second circuit is configured to detect the frequency component of an aircraft auxiliary power unit (APU).

13. A method, comprising:
  providing a first circuit configured to control power from an aircraft power source;
  providing a second circuit comprising a receiver, wherein the second circuit is configured to detect the presence of an active aircraft power source;
  monitoring the aircraft power source, by a second circuit, for noise;
  energizing the first circuit in response to the second circuit detecting the noise from the aircraft power source; and
supplying output power by the first circuit.

14. The method of claim 13, wherein the noise is at least one of an aircraft auxiliary power unit carrier signal and an electro-magnetic interference.

16. A power converter comprising:
a first circuit having an input configured to receive a power source having a first voltage, and configured to convert the first voltage to a second voltage, the first circuit configured to power a portable electronic device; and
  a second circuit coupled to a receiver and to the first circuit and wherein the second circuit is configured to identify if the power source is an aircraft power source by detecting an AC ripple of the power source.

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,115,341 B2 | |
| APPLICATION NO. | : 12/316279 | |
| DATED | : February 14, 2012 | |
| INVENTOR(S) | : Richard G. DuBose et al. | |

It is certified that error appears in the above-identified patent and that said Letters Patent is hereby corrected as shown below:

Column 6, lines 25-27, Claim 11 should read

11. The power converter of claim 5 wherein the second circuit is configured to detect the frequency component of an aircraft auxiliary power unit (APU).

Column 6, lines 31-41, Claim 13 should read

13. A method, comprising:
  providing a first circuit configured to control power from an aircraft power source;
  providing a second circuit comprising a receiver, wherein the second circuit is configured to detect the presence of an active aircraft power source;
  monitoring the aircraft power source, by a second circuit, for noise;
  energizing the first circuit in response to the second circuit detecting the noise from the aircraft power source; and
supplying output power by the first circuit.

Column 6, lines 42-44, Claim 14 should read

14. The method of claim 13, wherein the noise is at least one of an aircraft auxiliary power unit carrier signal and an electro-magnetic interference.

This certificate supersedes the Certificate of Correction issued April 10, 2012.

Signed and Sealed this
First Day of May, 2012

David J. Kappos
*Director of the United States Patent and Trademark Office*

Column 6, lines 48-56, Claim 16 should read

16. A power converter comprising:
a first circuit having an input configured to receive a power source having a first voltage, and configured to convert the first voltage to a second voltage, the first circuit configured to power a portable electronic device; and
  a second circuit coupled to a receiver and to the first circuit and wherein the second circuit is configured to identify if the power source is an aircraft power source by detecting an AC ripple of the power source.